US009133761B2

(12) United States Patent
McDonald-Walker

(10) Patent No.: US 9,133,761 B2
(45) Date of Patent: Sep. 15, 2015

(54) METHOD OF OPERATING A SUPERCHARGER

(75) Inventor: Ruaraidh McDonald-Walker, Spratton (GB)

(73) Assignees: NEXXTDRIVE LIMITED, London (GB); INTEGRAL POWERTRAIN LIMITED, Milton Keynes (GB)

( * ) Notice: Subject to any disclaimer, the term of this patent is extended or adjusted under 35 U.S.C. 154(b) by 1229 days.

(21) Appl. No.: 12/377,417

(22) PCT Filed: Aug. 14, 2007

(86) PCT No.: PCT/GB2007/003077
§ 371 (c)(1),
(2), (4) Date: Oct. 14, 2009

(87) PCT Pub. No.: WO2008/020184
PCT Pub. Date: Feb. 21, 2008

(65) Prior Publication Data
US 2010/0275890 A1    Nov. 4, 2010

(30) Foreign Application Priority Data

Aug. 14, 2006    (GB) .................................. 0616127.7

(51) Int. Cl.
*F02B 33/44* (2006.01)
*F02B 39/10* (2006.01)
(Continued)

(52) U.S. Cl.
CPC . *F02B 39/10* (2013.01); *B60K 6/24* (2013.01);
*B60K 6/46* (2013.01); *B60K 6/485* (2013.01);
*B60W 10/06* (2013.01); *B60W 10/08* (2013.01);
*B60W 20/00* (2013.01); *F02B 33/40* (2013.01);
*F02B 39/04* (2013.01); *Y02T 10/6217* (2013.01);
(Continued)

(58) Field of Classification Search
USPC ................................ 60/607, 608, 609; 290/52
See application file for complete search history.

(56) References Cited

U.S. PATENT DOCUMENTS 4,774,811 A * 10/1988 Kawamura ...................... 60/608
5,638,796 A *  6/1997 Adams et al. ................. 123/565
(Continued)

FOREIGN PATENT DOCUMENTS

DE        199 56 526        4/2001
DE        19956526 C1 *     4/2001   ............. F02B 37/14
(Continued)

*Primary Examiner* — Thomas Denion
*Assistant Examiner* — Patrick Maines
(74) *Attorney, Agent, or Firm* — Dickstein Shapiro LLP

(57) ABSTRACT

A method of operating a supercharger (10) for an automotive engine (20) is disclosed. A supercharger (10) has an input shaft (30) for coupling to a crank shaft (22) of the engine and also for coupling to the rotor of a first electrical machine (40) and the annulus of an epicyclic gear train (60). An output shaft (70) is connected to a compressor (80) and a sun gear of the epicyclic gear train (60). A carrier carrying planet gears of the epicyclic gear train (60) is connected to the rotor of a second electrical machine (50). The first electrical machine (40) is selectively operable to supply electrical energy to the second electrical machine (50). The second electrical machine (50) is selectively operable as a motor or a generator to accelerate or decelerate the compressor (80), thereby tending to increase or decrease the power output of the engine. The first electrical machine (40) is selectively operable as a motor or a generator to control the torque transmitted from the input shaft (30) back to the crank shaft (22) caused by operation of the second electrical machine (50).

21 Claims, 5 Drawing Sheets

(51) Int. Cl.
*B60K 6/24* (2007.10)
*B60K 6/46* (2007.10)
*B60K 6/485* (2007.10)
*B60W 10/06* (2006.01)
*B60W 10/08* (2006.01)
*B60W 20/00* (2006.01)
*F02B 33/40* (2006.01)
*F02B 39/04* (2006.01)

(52) U.S. Cl.
CPC .......... *Y02T 10/6226* (2013.01); *Y02T 10/6286* (2013.01); *Y02T 10/6295* (2013.01)

(56) References Cited

U.S. PATENT DOCUMENTS

| | | | | |
|---|---|---|---|---|
| 7,000,601 | B2 * | 2/2006 | Yasui et al. | 123/561 |
| 7,172,524 | B2 * | 2/2007 | Moeller | 475/5 |
| 8,397,501 | B2 * | 3/2013 | Barker | 60/608 |
| 2002/0171383 | A1 * | 11/2002 | Hisada et al. | 318/432 |
| 2004/0020229 | A1 * | 2/2004 | Adachi et al. | 62/236 |
| 2004/0221594 | A1 * | 11/2004 | Suzuki et al. | 62/236 |
| 2006/0263203 | A1 * | 11/2006 | Barker | 415/122.1 |
| 2011/0138808 | A1 * | 6/2011 | Lofgren | 60/607 |

FOREIGN PATENT DOCUMENTS

| | | | | |
|---|---|---|---|---|
| DE | 102 61 278 | | 7/2004 | |
| DE | 10261278 A1 * | | 7/2004 | B60K 41/00 |
| EP | 0 233 079 | | 8/1987 | |
| EP | 0 791 735 | | 8/1997 | |
| EP | 791735 A1 * | | 8/1997 | F02D 13/04 |
| EP | 1 300 587 | | 4/2003 | |
| GB | 2390871 A * | | 1/2004 | F02B 37/04 |
| JP | 58222965 A * | | 12/1983 | F02M 31/18 |
| JP | 2003269203 A * | | 9/2003 | F02D 23/00 |
| WO | WO 2004/072449 | | 8/2004 | |
| WO | WO 2004072449 A1 * | | 8/2004 | F02B 39/10 |

* cited by examiner

METHOD OF OPERATING A SUPERCHARGER

TECHNICAL FIELD

This invention relates to a method of operating a supercharger for an automotive engine.

BACKGROUND

WO-A1-2004/072449, the disclosure of which is incorporated herein in its entirety, describes an automotive air blower in the form of a supercharger for use with an automotive engine. The supercharger differs from a conventional supercharger in being operable to augment rotary power from the engine crankshaft with rotary power from one or more electric motors housed in a body of the supercharger.

More specifically, the supercharger includes an input shaft for coupling by a transmission belt to the crankshaft of the engine, and also includes an output shaft to which is fitted an air impellor. The supercharger further includes an epicyclic gear train, and first and second motor-generator electrical machines. The arrangement is such that the input shaft is coupled to the annulus of the epicyclic gear train and to the rotor of one of the electrical machines; the output shaft is coupled to the sun wheel of the epicyclic gear train; and the carrier of the epicyclic gear train is coupled to the other electrical machine.

This supercharger is advantageous in that it is operable to vary the pressure of air in the inlet manifold of the engine independently of the engine speed, and in an efficient and cost-effective manner. By varying the air pressure independently of engine speed, the supercharger can be very responsive to changes in load.

An object of this invention is to provide a method of operating superchargers similar to that described above.

At present, some drivers of passenger vehicles, such as cars (or "automobiles" in American English), favour larger engines over smaller engines. This is because larger engines offer certain performance advantages over smaller engines in terms of greater power output and, in the case of larger engines that have many cylinders, lower levels of noise and vibration harshness (NVH). Larger engines are, however, less efficient to operate and more expensive to manufacture than smaller engines.

Another object of this invention is therefore to provide a method that can be used to provide at least some of the performance advantages associated with a larger engine, and at least some of the cost and efficiency advantages associated with a smaller engine.

SUMMARY OF THE INVENTION

According to a first aspect of this invention, there is provided a method of operating a supercharger for an automotive engine, the supercharger having: an input shaft for coupling to an engine crankshaft, and coupled to the rotor of a first electrical machine and a first component of an epicyclic gear train; and an output shaft connected to a compressor and a second component of the epicyclic gear train; wherein the third component of the epicyclic gear train is connected to the rotor of a second electrical machine, wherein the first electrical machine is selectively operable to supply electrical energy to the second electrical machine and wherein the method includes the steps of:
(a) in response to one or more inputs indicative of a desired power output of the engine, selectively operating the second electrical machine as a motor or a generator to accelerate or decelerate the compressor, thereby tending to increase or decrease the power output of the engine; and
(b) selectively operating the first electrical machine as a motor or a generator to control the torque transmitted from the input shaft back to the crankshaft caused by the operation of the second electrical machine.

Step (b) may include controlling the rate of change of the torque transmitted from the input shaft. Step (b) may include reducing the rate of change of the torque transmitted from the input shaft. Step (b) may include controlling the torque such that the rate of change thereof does not exceed one or more limits.

Controlling the torque, or reducing the rate of change of the torque, transmitted from the supercharger back to the crankshaft (the "reflected" torque) in this way can minimise shocks on the engine and reduce the likelihood of the engine behaving in an undesirable manner. For example, it reduces the likelihood of the engine rapidly decelerating or even stalling during transient high load conditions, such as when trying to accelerate up a hill or pulling smartly away from rest; and accelerating rapidly during transient low load conditions, such as during gear changes. Whilst it might be thought that, in order to increase rapidly the engine power output, the first electrical machine should be operated as a generator to send a high level of electrical power to the second electrical machine in order to accelerate the compressor, operating the electrical machines in this way sends a large reflected torque back through the supercharger to the crankshaft to oppose the torque created by the engine. This results unexpectedly in a large and sudden reduction in the torque transmitted by the crankshaft to driveline components associated therewith, which in turn can cause a vehicle powered by the engine and supercharger to decelerate rapidly, resulting in the vehicle lurching undesirably. The engine may even stall. This is the opposite to what a driver would expect when demanding greater power from the engine.

It has surprisingly been found that the first electrical machine may advantageously be operated as a motor under such conditions in order to oppose and possibly balance this reflected torque.

Similarly, when the power output needed of the engine drops rapidly, for example during a gear change, the second electrical machine may advantageously be operated as a generator to slow the compressor and prevent stalling thereof and associated NVH problems. However, this results in a reflected torque being transmitted back through the supercharger to the engine crankshaft to add to that created by the engine. This results unexpectedly in a large and sudden increase in the torque transmitted by the crankshaft to the driveline components, which in turn can cause the vehicle to accelerate rapidly, again resulting in the vehicle lurching undesirably.

It has surprisingly been found that the first electrical machine may be operated as a generator under such conditions to opposed and possibly balance this reflected torque.

Thus, a smaller engine may be used and made to behave, at least in some respects, as if it were a larger engine.

In step (b) the first electrical machine may be operated in response to the or each input.

In response to the or each input being indicative of an increased desired power output, step (a) may include operating the second electrical machine as a motor and step (b) may include operating the first electrical machine as a motor. As stated above, this has the effect of controlling the reflected torque to the engine that might otherwise undesirably accelerate or decelerate the engine. Where the first and the second electrical machines are operating as motors, the method may include the step of drawing electrical energy from a rechargeable store of electrical energy.

There may be a plurality of positive rates of change of desired power output: a small positive rate of change, and/or a medium positive rate of change, and/or a large positive rate of change. Step (a) may include operating the electrical machine as a motor in response to the or each input being indicative of a small, a medium or a large positive rate of change in desired power output. Step (b) may include operating the first electrical machine as a generator to at least partially power the second electrical machine in response to the or each input being indicative of a small positive rate of change in desired power output. Step (b) may include operating the first electrical machine as neither a motor nor a generator in response to the or each input being indicative of a medium positive rate of change in desired power output. Step (b) may include operating the first electrical machine as a motor in response to the or each input being indicative of a large positive rate of change in desired power output. Step (b) may include operating the first electrical machine as a motor in response to the or each input being indicative of a vehicle powered by the engine and supercharger accelerating from a standstill.

In response to the or each input being indicative of a reduced desired power output, step (a) may include operating the second electrical machine as a generator and step (b) may include operating the first electrical machine as a generator. As stated above, this also has the effect of controlling the reflected torque to the engine that might otherwise case the engine undesirably to accelerate.

There may be a plurality of negative rates of change of desired power output: a small negative rate of change, and/or a medium negative rate of change, and/or a large negative rate of change. In response to the or each input being indicative of a small negative rate of change in desired power output step (a) may include operating the second electrical machine more slowly as a motor or not at all, and step (b) may include operating the first electrical machine as a generator but drawing a reduced amount of power therefrom, or not operating the first electrical machine at all. In response to the or each input being indicative of a large negative rate of change in desired output power, the second electrical machine may be operated as a generator to slow the compressor and thereby at least attempt to avoid the compressor stalling; and step (b) may include operating the first electrical machine as a generator to reduce the rate of change of reflected torque. As will be appreciated, when the pressure gradient across the compressor exceeds a certain level, the compressor may stall as a result of the air flow over the compressor stalling or even reversing in direction and temporarily travelling back across the compressor. Such stalling can cause NVH problems and may damage the compressor. Step (a) may include operating the second electrical machine as a generator, and step (b) may include operating the first electrical machine as a generator, in response to the or each input being indicative of, for example, a gear change, and/or an accelerator being released, and/or a clutch being disengaged, of a vehicle powered by the engine and supercharger.

The method may additionally include operating the first electrical machine as a generator to provide regenerative braking in response to the or each input being indicative of a reduced desired power output, and preferably in response to the or each input being indicative of the brakes of a vehicle powered by the engine being applied.

The method may also include operating the first electrical machine as a motor or a generator to control the speed of the engine during a gear change in a vehicle powered by the engine such that the engine speed substantially matches that required for the present vehicle speed in the new gear.

The method may also include operating the first electrical machine as a motor to assist the engine when the accelerator is depressed during, for example, a gear change, when out of gear, or when the clutch is disengaged. This causes the engine to have the appearance of "revving" more freely than would otherwise be the case. The second electrical machine may also be operated as a motor in such circumstances.

The method may also include operating the first electrical machine as a motor or a generator when the engine is idling or close to idling so as to cause the engine to operate with more constant speed than would otherwise be the case. This reduces cyclic variations in engine speed that would otherwise exist at or near idling speed. As will be understood, cyclic variations in engine speed are a cause of NVH problems. For example, the method may include operating the first electrical machine as a motor to mimic the firing of additional cylinders in-between the firing of the actual cylinders of the engine. Thus, a small engine with a small number or cylinders that would tend to seem coarse and unrefined at idling speeds can be made to behave as would a larger engine with more cylinders. The second electrical machine may also be operated as a motor in such circumstances. The method may include operating the first electrical machine as a motor when the engine is idling so as to allow the engine to idle at a speed below that at which it would usually idle.

The method may also include operating the first electrical machine as a motor to crank the engine during starting of the engine. The first electrical machine may in this way replace a starter motor.

The method may also include operating the first electrical machine as a motor during stopping of the engine to position the crankshaft of the engine in or adjacent a predetermined or known position. In this way the crankshaft can be positioned for quick and/or efficient subsequent starting of the engine.

The method may also include operating the first electrical machine as a motor or a generator to stop and start the engine when it is not needed. For example, the engine may be stopped when a vehicle powered by the engine is stationary and a brake is engaged, and then started when the brake is disengaged.

Preferably each electrical machine is connected to a voltage bus that is arranged for conveying electrical energy to the or each electrical machine operating as a motor and/or from the or each electrical machine operating as a generator. The voltage bus may also be connected to the rechargeable store of electrical energy such that net electrical energy generated by the electrical machines can be stored thereby and net electrical energy required by the electrical machines can be supplied thereby. The rechargeable store may include a rechargeable battery. The rechargeable store may include a capacitor. Preferably the capacitor is arranged for high voltage capacitative storage.

The method may include discharging the capacitor to supply at least part of the electrical energy needed by the first electrical machine to crank the engine during starting.

The voltage bus may be a high voltage bus and may be connected to a low voltage bus by a voltage booster. A rechargeable battery is preferably connected to the low voltage bus.

According to a second aspect of this invention, there is provided control apparatus for controlling the supercharger, the control apparatus arranged to operate the supercharger in accordance with a method according to the first aspect of this invention.

Preferably, the control apparatus includes a processor programmed and operable to cause the control apparatus to carry out the steps of the method. The control apparatus preferably includes at least part of an engine control unit ECU.

According to a third aspect of this invention, there is provided a computer program having code portion portions that when executed by the control apparatus cause that apparatus to carry out the steps of the method.

According to a fourth aspect of this invention, there is provided a record carrier having thereon a record indicative of the computer program.

The record carrier may be solid state memory device, such as, for example, an EPROM, EEPROM or flash memory. The record carrier may include optical or magnetic storage, such as a CD-ROM or magnetic computer disk.

The control apparatus may include a voltage bus that is arranged for conveying electrical energy to the or each electrical machine operating as a motor and/or from the or each electrical machine operating as a generator and wherein the voltage bus is for connecting to a rechargeable store of electrical energy such that net electrical energy generated by the electrical machines can be stored thereby and net electrical energy required by the electrical machines can be supplied thereby, wherein the rechargeable store includes a capacitor, such as a capacitor is arranged for high voltage capacitative storage.

Preferably, the first component of the epicyclic gear train is the annulus. Preferably, the second component epicyclic gear train is the sun wheel. Preferably, the third component of the epicyclic gear train is the carrier for the planet wheels. The epicyclic gear train may include toothed and meshing gear wheels; it may include wheels without teeth that rely on friction for transmitting torque therebetween.

Optional features of the invention defined hereinabove may, in combination with the features of the first aspect but without the features in steps (a) and (b) of that first aspect, constitute further aspects of this invention.

BRIEF DESCRIPTION OF THE DRAWINGS

Specific embodiments of the present invention are now described by way of example only and with reference to the accompanying drawings, in which.

DETAILED DESCRIPTION OF CERTAIN EXEMPLARY EMBODIMENTS

Figure 1:
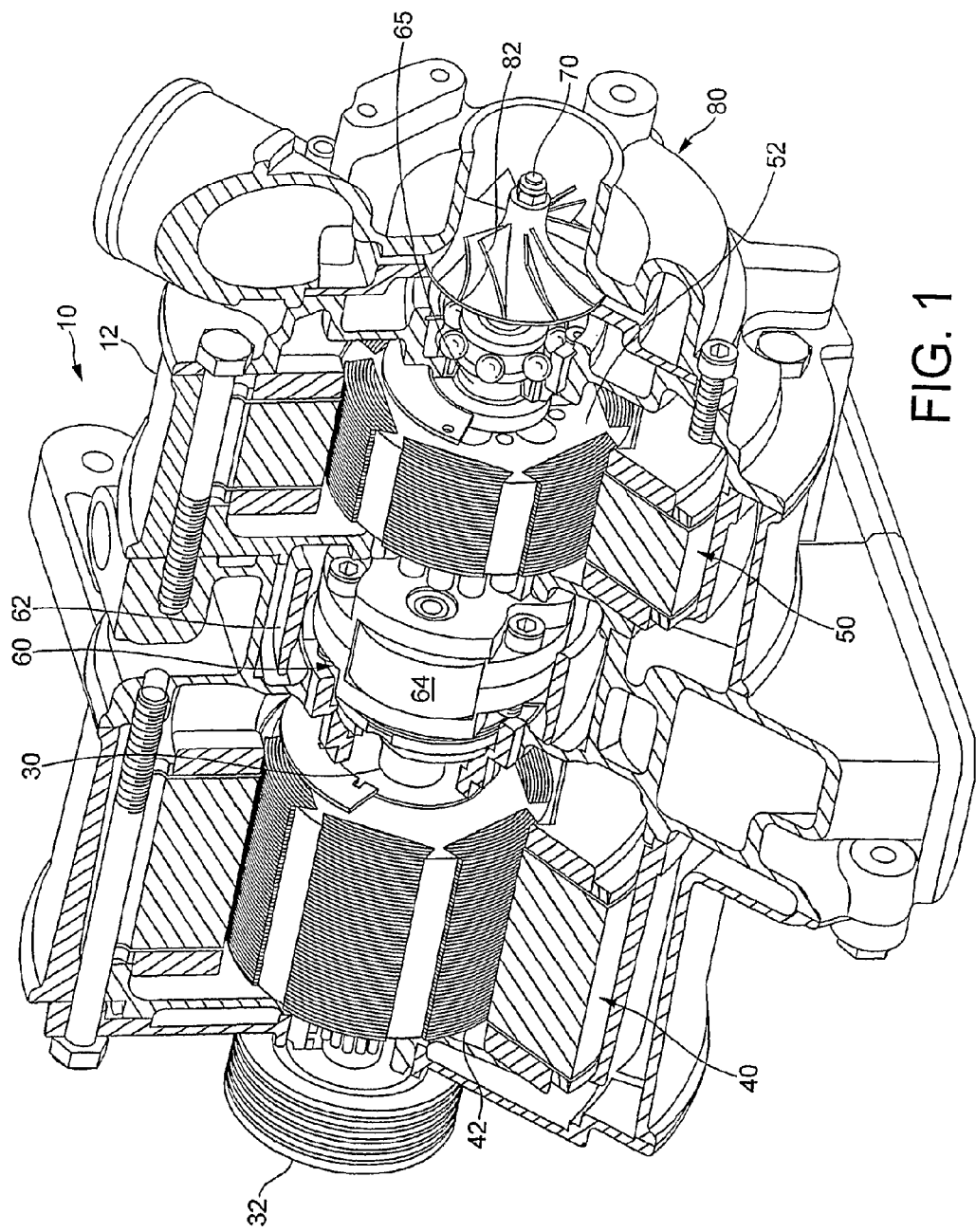
FIG. 1 is a perspective sectional view of a supercharger that is operated in accordance with a method embodying the present invention.
Figure 2:
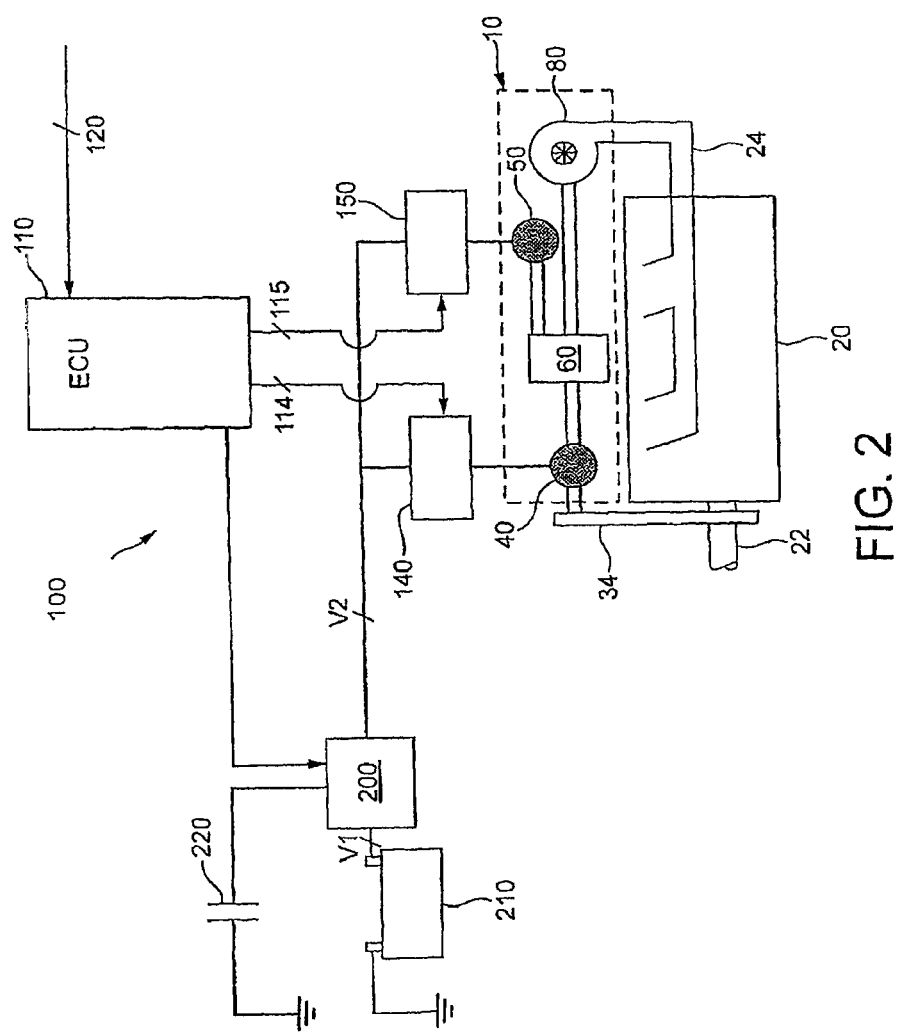
FIG. 2 is schematic diagram showing the supercharger, an engine and control apparatus for operating the supercharger in accordance with the method.

FIG. 1 shows a supercharger 10 for use with an automotive engine (shown at 20 in FIG. 2). The supercharger 10 includes a first electrical machine in the form of a first motor-generator 40 and a second electrical machine in the form of a second motor-generator 50 housed in a housing 12 of the supercharger 10. The first motor-generator 40 is housed at an input end of the supercharger 10, and the second motor-generator 50 is housed at an output end of the supercharger 10. An epicyclic gear train 60 is provided in the housing 12 between the two motor generators 40, 50. The epicyclic gear train 60 is made up of smooth gear wheels, and includes an annulus 62, a carrier 64 carrying planet gears, and a sun gear (not visible). The supercharger 10 also includes an input shaft 30 at its input end that supports a pulley 32. The input shaft 30 extends through the rotor 42 of the first electrical machine 40 with the rotor 42 being fixedly mounted thereon for rotation therewith. The end of the input shaft 30 that is remote from the input end terminates at a coupling to the annulus 62 of the epicyclic gear train 60. The carrier 64 of the epicyclic gear train 60 is coupled to a hollow shaft 65 that extends through the rotor 52 of the second motor-generator 50, such that the rotor is fixedly mounted thereon for rotation therewith. An output shaft 70 that is coupled to the sun gear extends from the sun gear and passes through the hollow shaft 65 and hence the rotor 52 of the second motor-generator 50 to emerge from the hollow shaft 65 at the output side of the supercharger 10. The end of the output shaft 70 that is remote from the sun gear 66 supports an air impellor 82 of a turbine 80 that is fixed to the output end of the supercharger 10.

Figure 4:
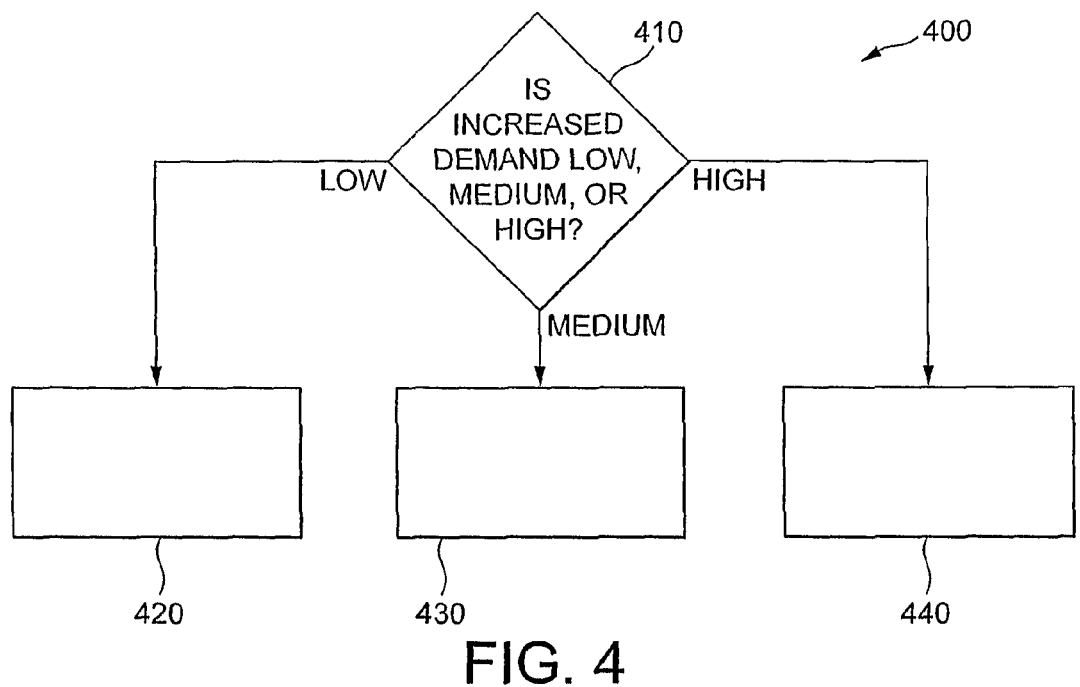
FIG. 4 is a flow diagram showing certain steps of an increased power demand routine of the method.

The supercharger 10 is therefore similar to that shown in FIG. 4 of WO-A1-2004/072449 and described therein with reference to that Figure.

As will be appreciated from the description in WO-A1-2004/072449, the speed of the first motor-generator 40 of the supercharger 10 described herein is fixedly linked to engine speed. This is because the rotor 42 of the first motor-generator 40 is coupled to the crankshaft of the engine 20, via the input shaft 30. The second motor-generator 50 is, however, free to rotate relative to the first motor generator 40 and the engine 20. If the second motor-generator 50 and the carrier 64 to which it is coupled are stationary, the epicyclic gear train 60 acts to rotate the sun gear and hence the output shaft 40 and the impellor 82 more quickly than the annulus 62, and hence more quickly than the input shaft 30, the first motor-generator 40 and the engine 20 to which the annulus 62 is coupled. If, however, the second motor generator 50 is operated to rotate in a direction opposite to that of the first motor generator 40, the epicyclic gear train 60 acts to rotate the impellor 82 even more quickly. If the second motor generator 50 is operated to rotate in the same direction as that of the first motor generator 40, the epicyclic gear train 60 acts to rotate the impellor 82 more slowly. Thus, the second motor-generator 50 can be used to increase or decrease the speed of the impellor 82 relative to the speed of the input shaft 30 and hence the engine 20, and thereby to vary the pressure of air in the inlet manifold (shown at 24 in FIG. 2) of the engine 20, which is also known as the "boost pressure".

In the present embodiment, the supercharger 10, and in particular the epicyclic gear train 60, is arranged such that:

Impellor speed=10.5$E1$–11.5$E2$ where $E1$ is the speed of the first motor-generator 40, $E2$ is the speed of the second motor-generator 50, and rotation in the direction of the engine is considered positive.

FIG. 2 of the drawings in the present disclosure shows, in schematic form, the supercharger 10 fitted to the engine 20. Although not shown, the engine 20 is fitted to a passenger vehicle, for powering the vehicle. In this embodiment the vehicle is a car (that is, an "automobile" in American English). The pulley 32 on the input shaft 10 of the supercharger 10 receives a transmission belt 34 therearound that also passes around a pulley on the crankshaft 22 of the engine 20. At the output end of the supercharger 10, the output shaft 70 of the compressor 80 is connected to an inlet manifold 24 of the engine 20. Although not shown, the inlet of the compressor 80 is connected to draw air via an air-filter in the conventional manner. It should be noted however, that, in alternative embodiments, the input shaft 30 may be coupled to the crankshaft by any suitable coupling. For example, a gear drive arrangement may be used.

FIG. 2 also shows associated control apparatus 100 for operating the supercharger 10. The control apparatus 100 includes an engine control unit (ECU) 110, a first motor-generator controller 140 and a second motor-generator controller 150. The first controller 140 is connected to the first motor-generator 40 of the supercharger 10. The second controller 150 is connected to the second motor generator 150. Each controller 140, 150 is connected to a high voltage bus V2 which is maintained at a high potential by voltage booster 200. The voltage booster 200 is a DC-to-DC converter. In this embodiment, the potential of the high voltage bus V2 is 600V. The voltage booster 200 is connected to a low voltage electrical bus V1 to which a rechargeable battery 210 is also connected. The voltage of the low voltage electrical bus V1 is approximately 12V. A high voltage capacitor 220 is also connected to the voltage booster and is operable to be charged from and discharged onto the high voltage bus V2.

As well as being connected to the high voltage bus V2, each controller 140, 150 is also connected to the ECU 110. The first controller 140 is connected to the ECU 110 along control path 114 to receive a desired torque signal indicative of a desired torque to be exerted by the first motor-generator 40 on the input shaft 30. The second controller 150 is connected to the ECU along control path 115 to receive a desired speed signal indicative of a desired speed of the second motor-generator 50. The first controller 140 is arranged to operate the first motor-generator 40 as either a motor or a generator and to vary the torque exerted by the motor-generator on the input shaft 30 in either mode in response to the desired torque signal. The second controller 150 is arranged to operate second motor-generator 150 as either a motor or a generator and to vary the speed of the motor-generator in either mode in response to the desired speed signal.

The first controller 140 is further arranged to sense the voltage of the high voltage bus V2 and in certain conditions to operate the first motor-generator 40 as a generator to maintain the high voltage bus V2 at a particular voltage. The second controller 50 receives a feedback signal from the second motor-generator 50 indicative of the speed thereof. This feedback signal is used to exercise closed-loop speed control over the second motor-generator 50 when operating as a motor.

The ECU 110 is connected to sensors (not shown) of the vehicle along several control paths to receive input signals indicative of: engine speed, throttle position, accelerator position, manifold air temperature, manifold air pressure, water temperature in the engine cooling system, brake pedal position (including the position in the dead travel zone), hand-brake position, clutch pedal position, voltage of the high voltage bus V2, voltage of the low voltage bus V1, vehicle speed and the position of the vehicle's starter button or ignition key. The control paths that convey the input signals to the ECU 110 are shown as a single input 120 for simplicity of illustration.

A method that embodies this invention will now be described. The method is implemented by the execution by the ECU 110 of instructions stored thereon in memory thereof. It is envisaged that the instructions be stored in a conventional manner.

Figure 3:
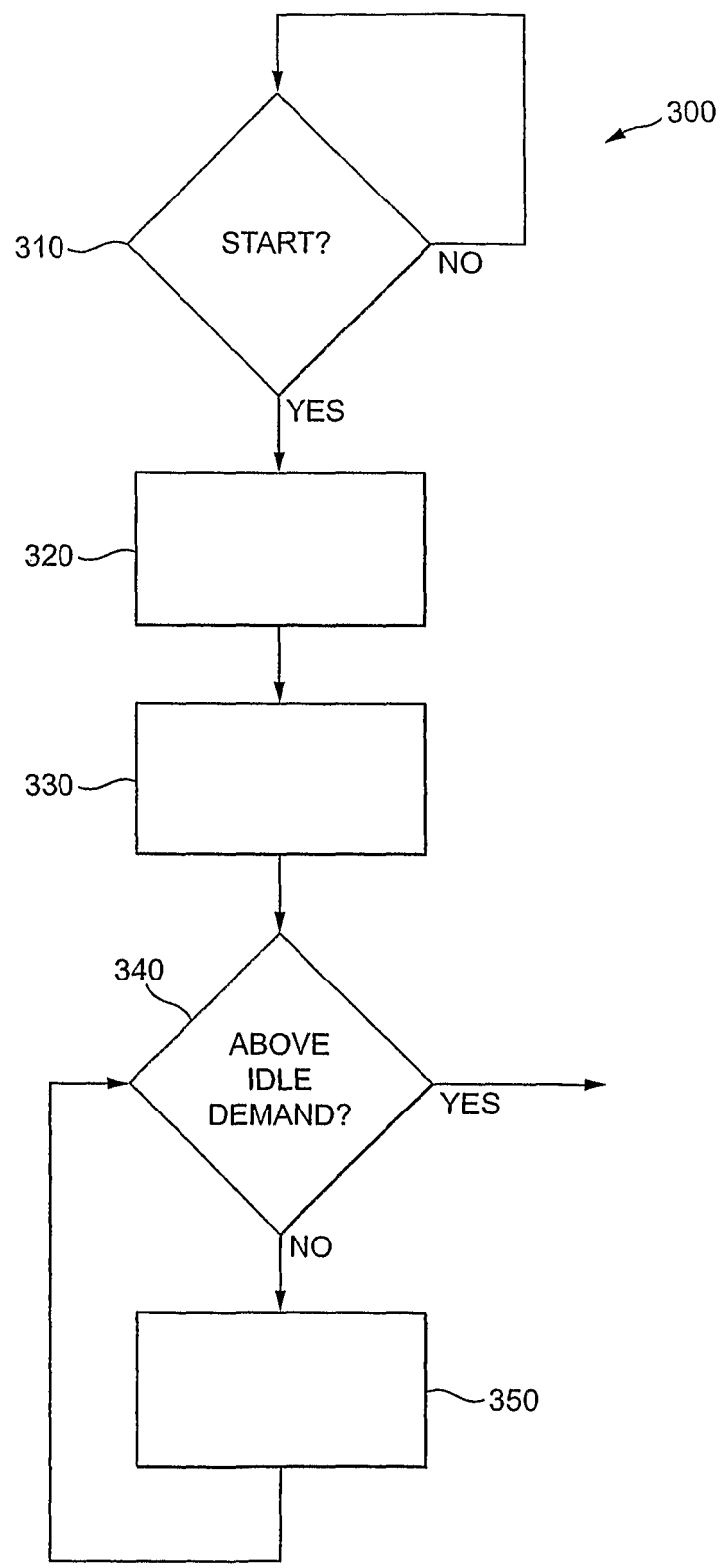
FIG. 3 is a flow diagram showing certain steps of a starting routine of the method.

With reference to FIG. 3, the method of operating the supercharger commences with a starting routine 300 at step 310 when the ECU 110 receives inputs indicative of a desire for the engine to start, which in this embodiment is an input indicating that the ignition key has been moved to a start position. Upon receiving such an input, the method proceeds to step 320 at which the ECU 110 sends a desired torque signal to the first controller 140 along control path 114. The desired torque signal is such that it causes the first controller 140 to operate the first motor-generator 40 as a motor to crank the crankshaft 22 of the engine 20. At the same time, the ECU 110 sends a control signal to the voltage booster 200 such that power is supplied to the high voltage bus V2 both from the battery 210 and by discharging the capacitor 220. Upon receiving the desired torque signal, the first controller 140 directs electrical power from the high voltage bus V2 to the first motor-generator 40 to crank and start the engine. By providing a high voltage capacitor that can be discharged onto the high voltage bus V2 during starting, less electrical power is drawn from the low voltage bus V1 than would otherwise be the case. Thus, the current on the low voltage bus V1 is lower than would otherwise be the case, which in turn allows less expensive power electronics and lighter wiring to be used.

The method then proceeds to step 330 at which the engine is running.

From step 330, the method proceeds to step 340 at which the method ascertains whether or not the power demanded of the engine is above that at which the engine idles. This is done by the ECU 110 receiving inputs indicative of the desired power output. In this embodiment, it is envisaged that these inputs include inputs indicative of engine speed and of accelerator pedal position. If the desired power output is not above that at which the engine 20 idles, the method proceeds to step 350. At step 350, the ECU 110 sends a desire torque signal along control line 114 that causes the first controller 140 to operate the first motor-generator 40 in a way that smoothes the speed of the engine 20. This is achieved by operating the first motor-generator 40 as a motor to transmit an oscillating torque to the crankshaft 22 that tends to prevent the engine 20 from slowing in-between ignition events of the engine 20. In this way, the method can be thought of as operating the first motor-generator as a motor to mimic the firing of additional cylinders and thereby mimic the performance of a larger, more refined, engine.

Whilst the desired power output is not above that at which the engine idles, the method remains at step 350. Should, however, the ECU receive inputs indicative of the desired power output being greater than that at which the engine 20 idles, the method proceeds to the increased power demand routine 400 shown in FIG. 4.

Before describing routines that deal with increased or reduced power demand (that is, with "transient" power demand), however, operation of the supercharger for steady-state engine operation is firstly described. It is envisaged that steady-state operation is operation in which the desired engine power output is neither increasing nor decreasing. An example of steady-state operation would be in powering the vehicle at constant speed along a level road. During steady-state operation of the engine 20, the method causes the first motor-generator 40 to operate as a generator and the second motor-generator 50 to operate as a motor. The voltage booster is also operated to charge the batter 210 and the capacitor 220 from the high voltage bus. In order to maintain the high voltage bus V2 at the desired voltage, the first controller 140 senses the voltage of the high voltage bus V2 and operates the first motor-generator 40 as a generator to maintain that voltage. Thus, there is a net flow of electrical energy onto the high voltage bus V2.

The increased power demand routine 400 of FIG. 4 is now described. This routine 400 starts at step 410 by ascertaining the level of the increased power demand. This is achieved by the ECU receiving inputs indicative of a transient increase in power demand. In other words, these inputs are indicative of a rate of change of power demand that is positive. It is envisaged that these inputs include inputs indicative of the rate of change of accelerator position, engine speed and rate of change of engine speed. The ECU 110 classifies the rate of change as either "low", "medium" or "high", based on the received inputs. In this embodiment, it is envisaged that a low rate of change corresponds to inputs indicative of gentle acceleration from driving speed, a medium rate of change corresponds to inputs indicative of a more rapid acceleration from driving speed, and a high rate of change corresponds to inputs indicative of maximum acceleration from driving speed or to inputs indicative of the vehicle pulling away from rest.

If it is ascertained that the rate of change is low, the method proceeds to step 420 at which the ECU 110 sends a desired torque signal along path 114 to the first controller 140 that causes the controller 140 to operate the first motor-generator 40 as a generator. At step 420, the ECU also sends a desired speed signal along path 115 to the second controller 150 that causes the second controller 150 to operate the second motor-generator 150 as a motor and to accelerate. Accelerating the second motor-generator 150 causes the output shaft 70 to accelerate, thereby increasing the boost pressure and tending to increase the power output of the engine 20. For a low, positive, rate of change in desired power output, it is envisaged that the first motor-generator 40, operating as a generator, can generate the electrical power needed to operate the second motor-generator 150 as a motor. Thus, the supercharger may be considered as being self-sustaining and does not require electrical power from elsewhere.

Although it has been found that accelerating the second motor-generator 150 also has the effect of transmitting torque back through the epicyclic gear train 60 to the input shaft 30 and hence the crankshaft 22 to oppose the torque generated by the engine 20, and that operating the first motor-generator as a generator adds to this "reflected" torque, the acceleration in step 420 is small enough such that the reflected torque has little or no effect as perceived by a driver of the vehicle.

If it is ascertained that the rate of change in power demanded is medium, the method proceeds to step 430 at which the ECU 110 sends control signals that cause the first motor-generator 40 not to operate, and that cause the second motor-generator 50 to operate as a motor and to accelerate at a higher rate than was the case in step 420, thereby increasing the boost pressure (and hence tending to increase the power output of the engine 20) more rapidly than in step 420. This higher acceleration of the second motor-generator 50 gives rise to a higher reflected torque back to the crankshaft 22. For this reason, the first motor-generator 40 is not operated as a generator, as to do so would be to add to the reflected torque such that torque transmitted by the crankshaft 22 to driveline components of the vehicle is suddenly and noticeably reduced, resulting in a rapid deceleration of the vehicle. Thus, the vehicle may suddenly appear to lurch. For this reason, in step 430, electrical power is supplied from the capacitor 220 via the voltage booster 200 onto the high voltage bus V2. In this was, the impellor 82 can be accelerated at a higher rate without causing undesirably changes in crankshaft torque. In this embodiment, electrical power is provided by the capacitor 220. As the capacitor stores electrical energy at substantially the same potential as the high voltage bus V2, electrical power can be supplied from the capacitor quickly and easily.

By contrast, if electrical power were supplied by the battery 210, this would first have to be up-converted by the voltage booster 200. In some embodiments, however, it is envisaged that the electrical power be supplied by the battery 210. This may supplement or be in substitution for power supplied by the capacitor 220.

If it is ascertained that the rate of change in power demanded is high, the method proceeds to step 440 at which the ECU sends control signals that cause the first motor-generator 40 to operate as a motor, and that cause the second motor-generator 50 also to operate as a motor and to accelerate at a higher rate than in step 430, thereby increasing the boost pressure (and hence tending to increase the power output of the engine 20) more rapidly than in step 430. The still higher acceleration of the second motor-generator 50 in step 440 gives rise to a correspondingly higher reflected torque. If this torque were transmitted back to the crankshaft 22, it would have the effect of reducing rapidly the torque transmitted by the crankshaft to driveline components of the vehicle, and would cause the vehicle to decelerate rapidly, such that it lurches uncomfortably, perhaps even stalling the engine 20. This is particularly the case when the vehicle is pulling away from rest, when high engine load is combined with low engine speed. It will be appreciated that such rapid deceleration is the very opposite response to depressing the accelerator pedal that the driver would expect. Such a response would therefore be highly undesirable. By also operating the first motor-generator 40 as a motor, however the amount of reflected torque is reduced to a level that avoids these problems.

Although not mentioned in detail herein, it will be appreciated by those skilled in this area of technology that the engine throttle is opened in advance of increasing boost pressure in response to an increased power demand. In certain embodiments or modes of operation in a particular embodiment, these two events may overlap, but generally they occur one after the other.

When the desired output power changes, method leaves the relevant one of steps 420, 430 and 440.

Whilst rates of change of power demand have been categorised above into three categories, it is envisaged that the method be arranged to differentiate between many different power demand levels within each category and to control the first 40 and second 50 motor-generators accordingly such that changes in the operation of the motor-generators 40, 50 occur smoothly with changing power demand. In so doing, it is envisaged that changes in the reflected torque transmitted by the supercharger 10 to the engine 20 are also smooth, and are such that they are not readily perceptible to the driver of the vehicle.

Figure 5:
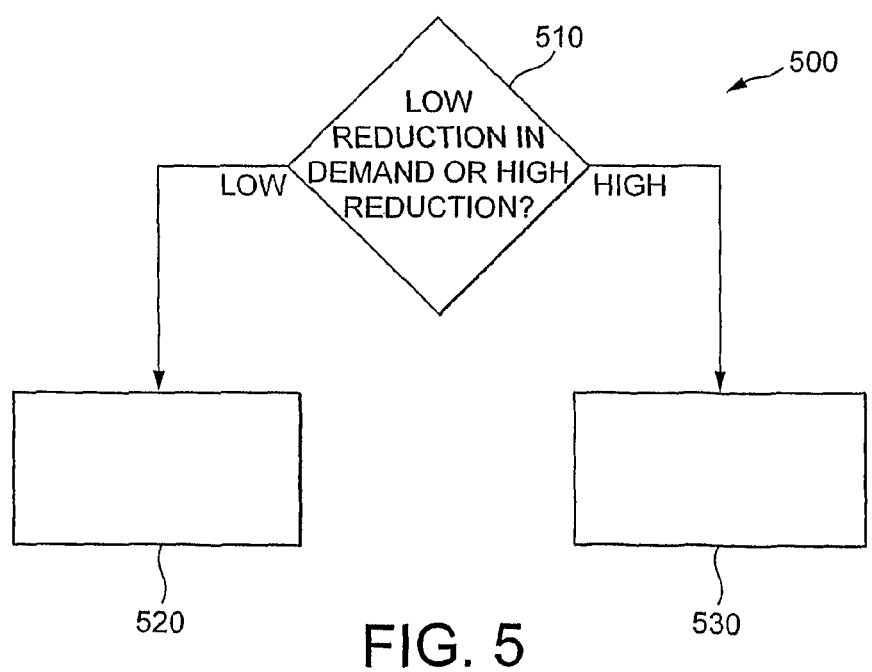
FIG. 5 is a flow diagram showing certain steps of a reduced power demand routine of the method.
Figure 6:
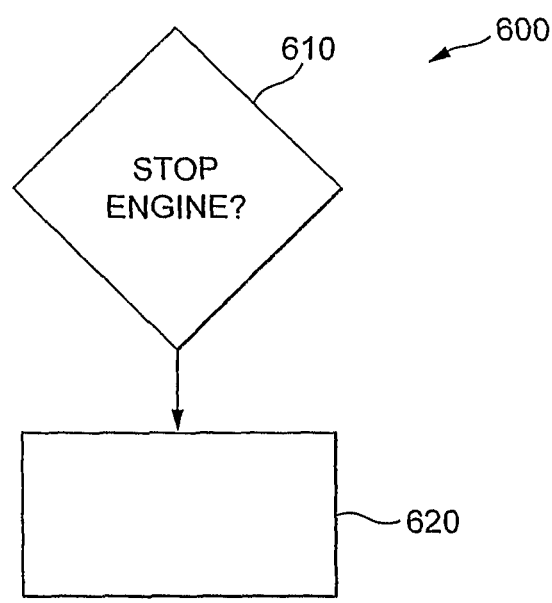
FIG. 6 is a flow diagram showing certain steps of an engine stopping routine of the method.

Should the ECU 110 receive inputs indicative of the desired power output being less than the current power output of the engine 20, the method proceeds to the reduced power demand routine 500 shown in FIG. 5.

The reduced power demand routine 500 starts at step 510 by ascertaining the level of the reduced power demand. This is achieved by the ECU 110 receiving inputs indicative of a transient decrease in power demand. In other words, these inputs are indicative of a rate of change of power demand that is negative. It is envisaged that these inputs are the same as those received in the increased power demand routine 400 described above with reference to FIG. 4. With continue reference to FIG. 5, in step 510 of the reduced power demand routine 500, the ECU 110 classifies the rate of change as either "low", or "high", based on the received inputs. In this embodiment, it is envisaged that a low rate of change corresponds to inputs indicative of the accelerator being released slightly whilst at a normal driving speed. It is envisaged that a high rate of change corresponds to inputs indicative of the accelerator being completely released whilst at a normal driving speed, such as during a gear change or during braking.

If it is ascertained that the negative rate of change of power demand is low, the method proceeds to step 520 at which the ECU 110 sends a desired speed signal along path 115 to the second controller 150 that causes the second controller 150 to operate the second motor-generator 150 to continue to operate as a motor, but to operate at a lower speed, thereby reducing the boost pressure. As the second electrical machine 50 will require less electrical power at this lower speed, the ECU 110 also sends a desired torque signal along path 114 to the first controller 140 that causes the controller 140 to operate the first motor-generator 40 as a generator, but to draw a reduced amount of electrical power therefrom. Thus, the supercharger 10 can be considered self-sustaining in this mode of operation, with there being no net flow of electrical energy onto or from the high voltage bus V2. Slowing the second motor-generator 50 and drawing a reduced amount of electrical power from the first motor-generator 40 in this way will have the effect of sending a reflected torque back to the crankshaft 22 that tends to combine with the torque generated by the engine 20 to cause the engine 20 to accelerate. It is envisaged however, that the reflected torque will be sufficiently small such that the driver perceives little or no sudden and uncomfortable change in the torque transmitted by the crankshaft 22.

If it is ascertained at step 510 that the rate of change of power demand is high, the method proceeds to step 530 at which the ECU 110 sends a desired speed signal along path 115 to the second controller 150 that causes the second controller 150 to operate the second motor-generator 50 as a generator in order to decelerate the impellor 82 of the compressor 80 rapidly. During a high, negative, rate of change in desired output power, it is advantageous to decelerate the impellor 82 in this way in order to avoid the pressure difference across the impellor 82 being so great that airflow over blades of the impellor 82 stalls, or even collapses back on itself. A stalling or collapsing airflow can give rise to increased levels of noise and vibration harshness (NVH) and may damage the compressor 80. Operating the second motor-generator 50 as a generator in this way results in a significant reflected torque being transmitted back to the crankshaft 22 that, were it left unchecked, would combine with the torque generated by the engine 20 to increase rapidly the torque transmitted by the crankshaft. As a result, the engine may accelerate greatly, i.e. to "race" if the clutch is disengaged, such as during a gear change. For this reason, at step 530, the ECU 110 sends a desired torque signal along control path 114 to the first controller 140 that causes the first controller 140 to operate the first motor-generator 40 as a generator in order to reduce or substantially cancel out the torque reflected by the second motor generator 50. It will be appreciated that in this mode of operation both motor-generators 40, 50 are operating as generators and are generating electrical power that is not needed to power any motor-generator 40, 50 operating as a motor. Thus the ECU 110 operates the voltage booster 200 such that electrical energy is caused to flow from the high voltage bus V2 to charge and battery 210 and the capacitor 220.

Should the ECU 110 no longer receive inputs indicative of a reduce power demand, the method leaves the reduced power demand routine 500.

Should the ECU 110 receive inputs indicative of a desire to stop the engine 20, the method proceeds to the engine stopping routine 600. In this embodiment, the ECU 10 receiving an input indicative of the ignition key being turned to an off position. The engine stopping routine begins at step 610 and progresses to step 620 at which the ECU 110 transmits a desired torque signal to the first controller 140 along path 114 to cause the first motor-generator 40 to operate firstly as a generator in order to slow the engine 20. The ECU 110 then transmits a desired torque signal such that the first motor-generator 40 is operated as a motor to position accurately the crankshaft 22 of the engine 20 in a preferred, known, position upon the engine 20 coming to rest. By positioning the crankshaft 20 in a preferred, known, position, the engine 20 can subsequently be started quickly and with low emissions.

In a second embodiment of this invention, the method may additionally provide for a mode of operation in which the first motor-generator 40 is operated as a motor to assist the engine 20 when the engine is idling, such that the engine can be idled at a speed lower than what would otherwise be its idling speed, thereby saving fuel.

In third embodiment, the method may additionally stop the engine 20 when the vehicle comes to a rest and then start the engine again before accelerating from rest. This may be achieved by operating the first motor-generator 40 as a motor to start the engine and as a generator to stop the engine.

In a third embodiment, the method may include a mode of operation in which the first motor-generator 40 is operated as a generator to slow the engine 20 and hence the vehicle under braking. The method may enter this mode of operation upon the ECU receiving an input indicative of a brake pedal of the vehicle being depressed. When operated as a generator in this way, the first motor-generator 40 may be used to recharge the battery 210 and also the capacitor 220. Thus, this mode of operation may be considered as a regenerative-braking mode.

In a fifth embodiment, it is envisaged that the ECU 110 be further arranged such that control of the supercharger in accordance with the method is integrated into both a torque control path and a charge control path of the ECU 110. It will be appreciated that existing engine management systems that employ Engine Control Units include a torque control path and a charge control path. This integration would allow the first motor-generator 40 to be used selectively to contribute to or oppose engine torque. Thus, the first motor-generator 40 may be used to make torque "interventions" in the output of the engine 20. In this way, and with appropriate feedback, closed-loop engine torque control can be provided. Similarly, integrating control of the supercharger 10 into the charge control path can be used to deliver closed-loop boost pressure control.

Integration of control of the supercharger into the charge control path may be used to control the air massflow and/or boost pressure downstream of the supercharger from exceeding a surge limit. It is envisaged that this may be done by varying the timing of the engine valves such that, for a cylinder, at least one inlet valve is open at the same time as one exhaust valve and air is forced straight through the combustion chamber. In other words, the engine is "overscavenged". This may also be used to cool the combustion chamber. It is particularly suited to direct-injection spark-ignition engines.

As the charge control path would usually be in communication with actuators associated with an electronic throttle plate, inlet valves and exhaust valves, integration of control of the supercharger may be integrated as a control variable for pre-throttle pressure and/or post-throttle pressure. In this way, pre-throttle pressure and/or post-throttle pressure and/or volumetric efficiency (a measure of air forced into the engine) and/or trapping efficiency (a measure of air retained in the engine) may be independently controlled.

In a sixth embodiment, the ECU 110 has access to a model indicative of minimum and/or maximum and/or ideal temperatures at which components of the supercharger 10 and/or the engine 20 may be operated. The model is used to determine operating limits of the supercharger in both steady-state and transient conditions. The modelling takes into account current and past engine power output demand, rate of cooling and ambient conditions to model accurate real time temperature values for components. The model can then be used to allow more aggressive operation of the supercharger than would otherwise be the case. In this sixth embodiment, it is also envisaged that a coolant circuit be provided in the supercharger 10 to cool components thereof, such as the first 40 and second 50 motor-generators, and electronics of the voltage booster 200 (and optionally an intercooler). This coolant circuit is separate from the conventional circuit used to cool the engine 10. A water temperature sensor would be provided in the separate coolant circuit in order to detect a loss of coolant flow. It is also envisaged that the model should provide for the rejection rate of heat from the separate coolant circuit, as controlled by the water flow rate and/or cooling fan speed, to be controlled by the ECU 110. Thus, performance of the supercharger 10 can be further controlled.

In a seventh embodiment, it is envisaged that sensors be provided to sense the condition of certain components of the supercharger 10 and/or of the engine 20. Temperature sensors may be provided to sense the temperature of certain of the components and operation of the supercharger 10 may be controlled to maintain one or more of the sensed temperatures within a preferred operating range. For example, operation of the supercharger 10 may be stopped if one or more of the sensed temperatures exceeds a predetermined maximum value.

A sensor may be provided to monitor the speed of the second motor-generator 50. The speed of the second motor-generator 50 may be limited by limiting a desired motor speed set point and/or controlling the current supplied to the second motor-generator 50.

Sensors may also be provided to monitor the speed of the first motor-generator 40. Outputs from these sensors, and from a crankshaft speed sensor, can be used to ascertain whether or not the input shaft 30 of the supercharger 10 is rotating at a different speed to that of the crankshaft 20, and hence whether or not the belt linking these two shafts has failed. If the belt has failed, the ECU 110 causes both the first and second motor-generators substantially not to rotate in order to protect the supercharger 10. In addition, a warning light is lit to warn the driver that the battery 210 is no longer being charged, and the ECU 110 sets an appropriate fault flag.

The method may be arranged to prevent continuous cranking of the engine in the event of the engine failing to start. This is in order to avoid the first motor-generator exceeding a maximum operating temperature, which may be modelled as described hereinabove. The method may achieve this by pausing cranking of the engine and allowing hot components, such as the first motor-generator, to cool down before restarting cranking. This prevention of continuous cranking may be particularly useful where the method includes an automatic starting routine.

Sensors may also be provided to detect and compare the actual speed of the first 40 and/or second 50 motor-generators when operating as motors with desired motor speed. If an error develops, the ECI 110 powers down the or each motor to which the error relates and sets an appropriate fault flag.

The ECU 10 and of the first 140 and second 150 controllers may also operate to detect electrical faults with the first 40 and second 50 motor-generators and may operate to shut down the motor generator affected by a detected fault. In such circumstances, the ECU 110 would set an appropriate fault flag.

Faults in the booster 200 and/or the first and second controllers 140, 150 would also be detected and communicated to the ECU 110. Again, an appropriate fault flag would be set and a warning light may be lit.

The invention claimed is:

1. A method of operating a supercharger for a vehicle engine, the supercharger having an input shaft for coupling to an engine crankshaft, and coupled to a rotor of a first electrical machine and a first component of an epicyclic gear train; and an output shaft connected to a compressor and a second component of the epicyclic gear train; wherein a third component of the epicyclic gear train is connected to a rotor of a second electrical machine, wherein the first electrical machine is selectively operable to supply electrical energy to the second electrical machine and wherein the method comprises the steps of:
   (a) in response to one or more inputs indicative of an increased desired power output of the engine, operating the second electrical machine as a motor to accelerate the compressor, thereby tending to increase the power output of the engine; and
   (b) operating the first electrical machine as a motor to control the torque transmitted from the input shaft back to the crankshaft caused by the operation of the second electrical machine, wherein step (b) further comprises controlling the torque such that the rate of change thereof does not exceed one or more limits.

2. A method according to claim 1 wherein there are a plurality of levels of increased desired power output, including at least a first increase in desired power output, a second increase in desired power output which is lower than the first increase in desired power output, and a third increase in desired power output which is higher than the first increase in desired power output, and the method further comprises operating the first electrical machine as a generator to at least partially power the second electrical machine in response to the one or more inputs being indicative of the second increase in desired power output.

3. A method according to claim 2, wherein the method further comprises operating the first electrical machine as neither a motor nor a generator in response to the one or more inputs being indicative of the first increase in desired power output.

4. A method according to claim 3, wherein the method further comprises operating the first electrical machine as a motor in response to the one or more inputs being indicative of the third increase in desired power output.

5. A method according to claim 1, further comprising operating the first and second electrical machines as a motors in response to the one or more inputs indicating that a vehicle powered by the engine and supercharger is accelerating from a standstill.

6. A method according to claim 1, wherein, in response to the one or more inputs indicating a reduced desired power output, step (a) further comprises operating the second electrical machine as a generator; and step (b) further comprises operating the first electrical machine as a generator.

7. A method according to claim 1, wherein there are a plurality of levels of reduced desired power output including at least a first level of reduced desired power output and a second level of reduced desired power output which is higher than the first level of reduced desired power output and, in response to the one or more inputs being indicative of the second level of reduced desired output power, the method further comprising operating the second electrical machine as a generator to slow the compressor and thereby at least attempt to avoid the compressor stalling; and operating the first electrical machine as a generator to reduce the rate of change of transmitted torque from the supercharger back to the engine.

8. A method according to claim 1, wherein the method further comprises operating the second electrical machine as a generator, and operating the first electrical machine as a generator, in response to the one or more inputs indicating a gear change, an accelerator being released, and/or a clutch being disengaged, of a vehicle powered by the engine and supercharger.

9. A method according to claim 1, further comprising operating the first electrical machine as a motor or a generator to control the speed of the engine during a gear change in a vehicle powered by the engine such that the engine speed substantially matches that required for the present vehicle speed in the new gear.

10. A method according to claim 1, further comprising operating the first electrical machine as a motor to assist the engine when an accelerator is depressed and the engine is not coupled to wheels of the vehicle.

11. A method according to claim 1, further comprising operating the first electrical machine as a motor or a generator when the engine is idling or close to idling so as to cause the engine to operate with a more constant speed at or close to idling.

12. A method according to claim 11, further comprising operating the first electrical machine as a motor to mimic the firing of notional, additional, cylinders in-between the firing of the actual cylinders of the engine.

13. A method according to claim 1, further comprising operating the first electrical machine as a motor, at a low speed below what would otherwise be an idling speed of the engine in order to allow the engine to idle at the low speed.

14. A method as in claim 13, further comprising operating the second electrical machine as a motor at said low speed.

15. A method according to claim 1, further comprising operating the first electrical machine as a motor during stopping of the engine to position the crankshaft of the engine in a predetermined position.

16. A non-transitory record carrier having recorded thereon a computer program having code portions that when executed by a control apparatus cause the control apparatus to carry out the steps of a method according to claim 1.

17. A method according to claim 1, wherein step (b) further comprises reducing a rate of change of the torque transmitted from the input shaft.

18. A method according to claim 1 in which, in step (b), the first electrical machine is operated in response to the one or more inputs.

19. A control apparatus for a supercharger for a vehicle engine, wherein the supercharger comprises:
   an input shaft for coupling to an engine crankshaft, and coupled to a rotor of a first electrical machine and a first component of an epicyclic gear train; and an output shaft connected to a compressor and a second component of the epicyclic gear train; wherein a third component of the epicyclic gear train is connected to a rotor of a second electrical machine, wherein the first electrical machine is selectively operable to supply electrical energy to the second electrical machine and,
   wherein the control apparatus comprises an engine control unit configured to operate the supercharger by:
   (a) in response to one or more inputs indicative of an increased desired power output of the engine, operating the second electrical machine as a motor to accelerate the compressor, thereby tending to increase the power output of the engine; and
   (b) operating the first electrical machine as a motor to control the torque transmitted from the input shaft back to the crankshaft caused by the operation of the second electrical machine, wherein step (b) further comprises controlling the torque such that the rate of change thereof does not exceed one or more limits.

20. A control apparatus according to claim 19 wherein the engine control unit comprises a processor.

21. A control apparatus according to claim 19, further comprising a voltage bus that is arranged for conveying electrical energy to each electrical machine operating as a motor and/or from each electrical machine operating as a generator and wherein the voltage bus is also connected to a rechargeable store of electrical energy such that net electrical energy generated by the electrical machines can be stored thereby and net electrical energy required by the electrical machines can be supplied thereby, wherein the rechargeable store includes a capacitor.

* * * * *